United States Patent [19]

Arter et al.

[11] 4,450,015

[45] May 22, 1984

[54] APPARATUS AND METHOD FOR PROVIDING A SMOOTH EDGE ON SHEARED METAL

[76] Inventors: William L. Arter, 1214 Margarita Dr., Fullerton, Calif. 92633; Byron L. Russell, 24882 Rollingwood Rd., El Toro, Calif. 92630

[21] Appl. No.: 406,444

[22] Filed: Aug. 9, 1982

[51] Int. Cl.³ .............................................. B23K 7/00
[52] U.S. Cl. ..................................... 148/9 R; 266/50
[58] Field of Search ................. 148/9 R, 9.5; 266/48, 266/50, 52

[56] References Cited

U.S. PATENT DOCUMENTS

| | | | |
|---|---|---|---|
| 1,957,351 | 5/1934 | Oldham | 266/51 |
| 2,125,180 | 7/1938 | Serner | 266/48 |
| 2,184,562 | 12/1939 | Rockefeller et al. | 266/51 |
| 2,266,552 | 12/1941 | Jones | 266/51 |
| 2,288,026 | 6/1942 | Rea | 266/48 |
| 2,470,999 | 5/1949 | Meincke | 266/51 |

Primary Examiner—W. Stallard
Attorney, Agent, or Firm—Jackson, Jones & Price

[57] ABSTRACT

A method and apparatus for providing a smooth radius on an edge of a sheared metal sheet are disclosed. The apparatus includes a heating element, such as an oxyacetylene torch, and a supporting frame incorporating means for translating said sheared edge in predetermined relationship with said heating element. The method encompasses the steps of causing relative translation between a heating element and the previously sheared edge of a metal sheet to accomplish the reduction of said edge to a smooth radius.

8 Claims, 3 Drawing Figures

APPARATUS AND METHOD FOR PROVIDING A SMOOTH EDGE ON SHEARED METAL

BACKGROUND OF THE INVENTION

It is well known to thiose skilled in the art that elongated sheets of metal derived from rolls of metallic stocks, such as steel or the like, are subsequently sheared longitudinally to provide the raw material for various fabricating operations.

During the shearing process, it is inevitable that the resulting edge is somewhat deformed and irregular because of the fact that the shearing process is, essentially, constituted by a refined and controlled tearing of the metal.

This is more frequently the case where shearing tools, such as knives, saws and the like, become slightly dulled and a gradually more imperfect edge is imparted to the sheared sheet.

Because of difficulties in controlling the shearing process, it is customary in the metal-forming arts to provide a foldover edge on most articles fabricated from raw sheared metal to eliminate the inherent mechanical and esthetic difficulties arising from the utilization of sheared sheet metal.

Obviously, in addition to injecting an additional and expensive step into the fabricating process, the foldover edge consumes an additional quantity of metal which, in large production runs, can result in substantial expense to the fabricator.

It is well known to those skilled in the art that metals can be cut or removed by the use of various types of thermo-chemical and thermoelectrical cutting or severing.

Exemplary of such methods and apparatus are those shown in U.S. Pat. Nos. 1,957,351; 2,125,180; 3,266,552; 2,184,560; 2,288,026; and 2,470,999.

The aforementioned patents disclose methods of removing or cutting metals. For instance, U.S. Pat. No. 1,957,351 discloses a method of removing metal by the use of a welding nozzle and a highly oxidizing gas stream.

The only patent of the aforementioned group of patents which is concerned with forming an edge on metal members is U.S. Pat. No. 2,184,560 which discloses a method and apparatus for thermo-chemically cutting or severing ferrous metal bodies and for forming shaped edges on metal members.

The method of the U.S. Pat. No. 2,184,560 patent involves the application of a low velocity gaseous metal removing medium against a metal member whose edge is to be shaped and forming a groove along and in one surface thereof. Subsequently, a portion is severed from said member by flame cutting lengthwise of the groove, the cut extending from the wall of the groove through the remaining thickness of the member to the surface of the member opposite that having the groove.

OBJECTS AND ADVANTAGES OF THE INVENTION

It is a primary object of my invention to provide a method and apparatus for creating a smooth edge on the sheared edge of a metal sheet or plate without the removal of metal from said edge and without extensive pre-grooving or other mechanical treatment of said plate or sheet.

A further object of my invention is the provision of an apparatus for imparting a smooth edge to a sheet of metal having a sheared edge by exposing said sheared edge to a source of heat of sufficient intensity to reduce said sheared edge to a relatively uniform, smooth radius.

In the practice of the method of the invention the sheared edge is subjected to a source of intense heat, for instance, in the case of ferrous metals, 2500° C., and the sheared edge is translated relatively to the heat source to reduce the sheared edge to the melting point of the metal and cause it to assume a relatively smooth, uniform radius.

An additional object of my invention is the provision of an apparatus of the aforementioned character which includes a supporting frame for the metallic sheet; a heating element adapted to generate sufficient heat to reduce the sheared edge of the metal to a liquid phase; and means for causing relative translation between the sheared edge and the source of heat.

Typical heating elements or heat sources can include oxy-acetylene torches or the like, and it is not intended that the scope of the invention be limited to any particular heating source. Furthermore, the heating element can be translated with respect to the sheared edge or the sheared edge can be translated with respect to the heating element.

Moreover, it is not intended that the application of the teachings of the invention be limited solely to the treatment of the sheared edges of ferrous metals since it is conceivable that various other metals might be subjected to the same process and similar apparatus.

DESCRIPTION OF THE DRAWINGS

Other objects and advantages of the invention will be apparent from the following specification and the accompanying drawings, which are for the purpose of illustration only, and in which.

DESCRIPTION OF THE PREFERRED EMBODIMENT IN THE INVENTION

Figure 1:
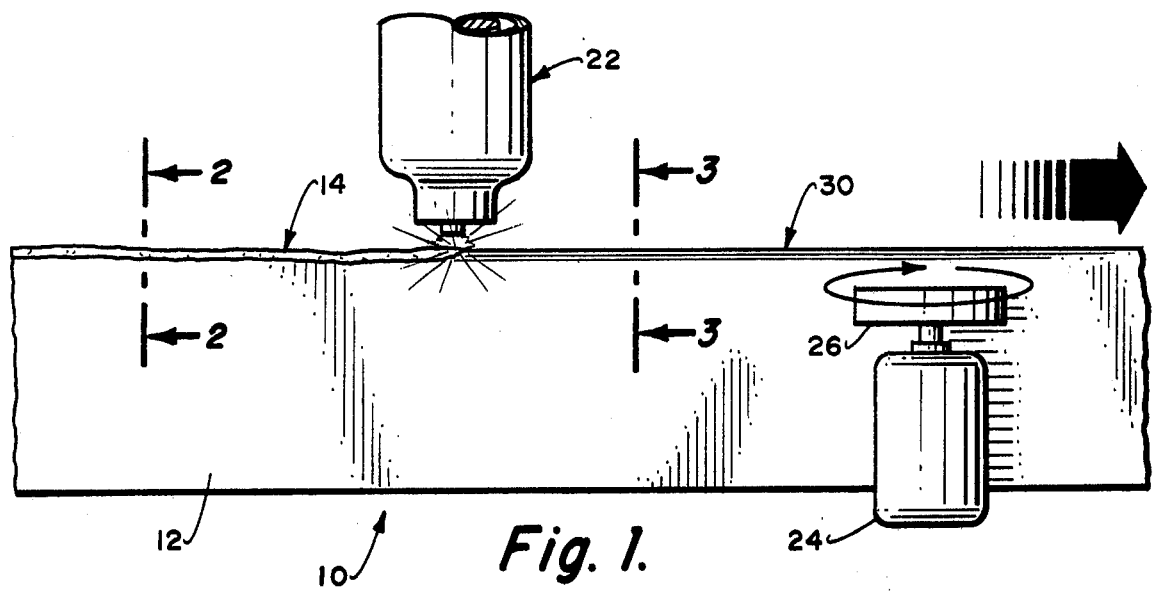
FIG. 1 is a schematic view illustrating a typical apparatus and method of the invention.
Figure 2:
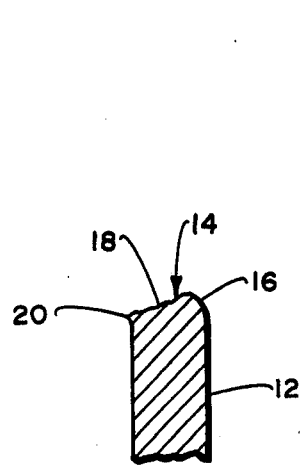
FIG. 2 illustrates the approximate condition of the sheared edge of a sheet of ferrous metal prior to the utilization of the apparatus and method of the invention in creating a radius thereupon.

Referring to the drawing, and particularly to FIG. 1 thereof, I show, schematically, an apparatus 10 for creating a smooth radius on a previously sheared edge of a metal sheet or strip 12. The sheared edge 14 is created by various types of cutting implements and is characterized, as best shown in FIG. 2 of the drawing, by an area 16 of plastic deformation; a burnished area 18; and a burr 20. The burr 20, particularly, is objectionable in the fabrication of manufactured parts because it acts as a cutting edge and also is a stress concentrating area. In any event, esthetically and structurally, the uneven edge 14 constituted by these various areas is unacceptable on completed manufactured parts and, conventionally, such expedients as folded over edges or mechanically abraded edges are provided to eliminate the problem of the sheared edge 14.

The sheet or strip 12 may be fabricated from ferrous metal and is positioned in a fixture, not shown, which supports a heating element 22 in juxtaposition to the sheared edge 14 of the strip or sheet 12. The heating element 22 can be any type of welding head which will create sufficient heat to momentarily reduce the sheared edge 14 to its liquid phase. For instance, an oxy-acetylene torch can be utilized as the heating element 22. If the edge of an aluminum sheet is being subjected to the process or method of the invention by the utilization of the apparatus 10, a welding head suitable for use on aluminum may be utilized.

Also supported on the frame or fixture, not shown, is an electric motor 24 which drives a rotary translating wheel 26 impinging on an adjacent surface of the strip or sheet 12 to cause, in conjunction with similar wheels, not shown, the longitudinal translation of the strip or sheet 12 below the heating element 22.

Suitable locating means, of conventional construction, not shown, are utilized to maintain the strip or sheet 12 in predetermined juxtaposition to the heating portion of the heating element 22. In the case of ferrous metal, the melting temperature is 2500° F. and the heating element 22 must be capable of maintaining that temperature as the sheet or strip 12 is translated by means of the rotary translating wheels 26 to cause the sheared edge of the sheet 12 to be exposed to the reducing temperature generated by the heating element 22 and to reduce the sheared edge to a liquid phase which causes the formation of a smooth radius 30 on the previously sheared edge 14, as best shown in FIG. 3 of the drawing.

Figure 3:
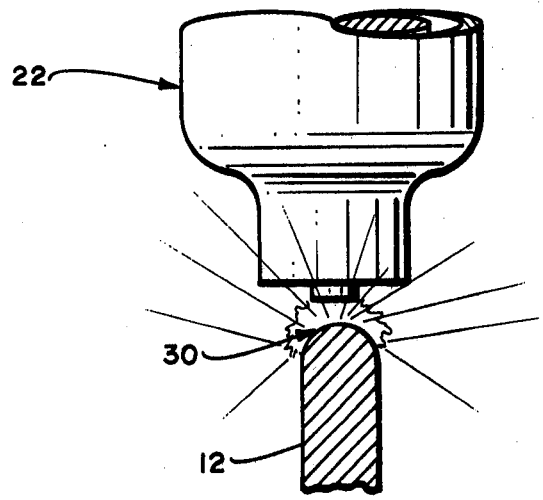
FIG. 3 is a view showing the creation of a smooth radius on the sheared edge of FIG. 2 by the juxtaposition of said sheared edge to a heating element capable of reducing the sheared edge, momentarily, to its liquid phase.

It should be noted that none of the metal is removed in the creation of the smooth radius by the apparatus of the invention and it should be further noticed that no preliminary treatment of the metal is necessary to achieve the smooth radius schematically shown in FIG. 3 of the drawing.

The method of the invention contemplates the initial step of locating a sheet or strip of metal having a sheared edge in juxtaposition to a heating element capable of generating heat sufficient to momentarily reduce the sheared edge to its liquid phase and the subsequent step of relative translation between the sheared edge and the heating element to cause momentary exposure of the sheared edge to the heat generated by the heating element and consequent creation of the smooth radius upon the previously sheared edge of the metallic sheet.

Although the apparatus shown discloses the sheet or strip 12 as being longitudinally translated in reference to a fixed heating element 22, it will be obvious to those skilled in the art that the heating element 22 can be translated while the strip or sheet 12 is maintained immobile.

Although I have disclosed preferred embodiments of the method and apparatus of the invention, it is not intended that the invention be limited to the specific details thereof since it will be obvious to those skilled in the art that variants of the method and apparatus of the invention can be utilized which will still fall within the scope of the appended claims.

I claim:

1. In an apparatus for reducing the sheared edge of a metal sheet, the combination of: a supporting frame; a heating element mounted on said frame; means on said frame for positioning the edge of said sheet in juxtaposition to said heating element; and means for causing relative translation of said heating element and said edge to reduce said edge to a uniform, smooth radius.

2. The apparatus of claim 1 in which said heating element is immobile and said sheet is translated so that said edge is maintained in a predetermined relationship to said heating element.

3. The apparatus of claim 1 in which said sheet is maintained against movement and said heating element is translated along said edge while maintaining a predetermined relationship of said element with said sheet.

4. The apparatus of claim 1 wherein means are provided to control the relative speed of translation between said sheet and said heating element.

5. The apparatus of claim 1 wherein said heating element is an oxy-acetylene torch.

6. The apparatus of claim 1 in which said translating means is constituted by rotary members engageable with opposite surfaces of said sheet.

7. In a method of reducing the sheared edge of a metallic sheet, the steps of: placing said sheet in a supporting fixture; and causing relative translation between an edge of said sheet and a heating element to reduce said edge to a smooth radius.

8. The method of claim 7 in which the sheet whose edge is subjected to the reducing process is fabricated from ferrous metal.

* * * * *